United States Patent
Chen et al.

(10) Patent No.: US 11,270,150 B2
(45) Date of Patent: Mar. 8, 2022

(54) COMPUTING DEVICE AND METHOD FOR GENERATING AN OBJECT-DETECTING MODEL AND OBJECT-DETECTING DEVICE

(71) Applicant: Institute For Information Industry, Taipei (TW)

(72) Inventors: Yen-Lin Chen, Taipei (TW); Hsiu-Chih Chen, Taipei (TW); Chieh-Min Chang, Taipei (TW); Chao-Wei Yu, Taipei (TW); Meng-Tsan Li, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 170 days.

(21) Appl. No.: 16/701,140

(22) Filed: Dec. 2, 2019

(65) Prior Publication Data
US 2021/0142100 A1 May 13, 2021

(30) Foreign Application Priority Data
Nov. 7, 2019 (TW) ................................ 108140465

(51) Int. Cl.
*G06K 9/46* (2006.01)
*G06K 9/62* (2022.01)
*G06N 3/08* (2006.01)

(52) U.S. Cl.
CPC ......... *G06K 9/4642* (2013.01); *G06K 9/6257* (2013.01); *G06K 9/6263* (2013.01); *G06N 3/08* (2013.01)

(58) Field of Classification Search
CPC .. G06K 9/4642; G06K 9/6263; G06K 9/6257; G06N 3/08

USPC .......................................................... 382/159
See application file for complete search history.

(56) References Cited

U.S. PATENT DOCUMENTS

| | | |
|---|---|---|
| 2003/0179931 A1 | 9/2003 | Sun |
| 2018/0089505 A1 | 3/2018 | El-Khamy et al. |
| 2019/0258878 A1* | 8/2019 | Koivisto .................. G05D 1/00 |
| 2019/0391578 A1* | 12/2019 | Tariq .................... G05D 1/0231 |
| 2019/0392242 A1* | 12/2019 | Tariq .................... G05D 1/0088 |

(Continued)

FOREIGN PATENT DOCUMENTS

| | | |
|---|---|---|
| CN | 107123123 A | 9/2017 |
| TW | 200638287 A | 11/2006 |

OTHER PUBLICATIONS

Zhao, "Object detection with deep learning: A review" arXiv Apr. 16, 2019 (Year: 2019).*

(Continued)

*Primary Examiner* — Juan A Torres
(74) *Attorney, Agent, or Firm* — Maschoff Brennan

(57) ABSTRACT

A computing device divides a training image into a plurality of training blocks, and the training image includes a training object. The computing device calculates, for each of the training blocks, a correct confidence score of the training object covering the training block according to an image-marking data and a confidence-score-translating function, and the image-marking data includes a piece of location information of the training object in the training image. Then, the computing device trains a deep-learning model with the training image, the correct confidence scores and the image-marking data to generate the object-detecting model.

18 Claims, 8 Drawing Sheets

(56) References Cited

U.S. PATENT DOCUMENTS

2021/0125006 A1* 4/2021 Seo .................... G06K 9/46

OTHER PUBLICATIONS

Redmon, "You Only Look Once: Unified, Real-Time Object Detection," arXiv May 9, 2016 (Year: 2016).*
The concise explanation of the relevance of the Taiwan Office Action is provided in the attached machine-generated English language translation of a summary of the Office Action.
The concise explanation of the relevance of the TW 200638287 A reference is provided in the English language abstract at the begining of the document.
The concise explanation of the relevance of the CN 107123123 A reference is provided in the English language abstract, description and claims at the beginning of the document.
US 2018/0089505 A1 is the US counterpart of TW 201814591 A.
US 2003/0179931 A1 is the US counterpart of TW I281126.
The CN 107123123 B reference is being provided in the form of CN 107123123 A.
Office Action to the corresponding Taiwan Patent Application rendered by the Taiwan Intellectual Property Office (TIPO) dated Sep. 29, 2020, 6 pages.

* cited by examiner

COMPUTING DEVICE AND METHOD FOR GENERATING AN OBJECT-DETECTING MODEL AND OBJECT-DETECTING DEVICE

PRIORITY

This application claims priority to Taiwan Patent Application No. 108140465 filed on Nov. 7, 2019, which is hereby incorporated by reference in its entirety.

FIELD

The present invention relates to a computing device and method for generating an object-detecting model, and an object-detecting device. More specifically, embodiments of the present invention relate to a computing device and method for training a deep-learning model with confidence scores of blocks of a training image to generate an object-detecting model, and an object-detecting device for detecting whether a target object exists in the image through the object-detecting model.

BACKGROUND

In the traditional image object detection techniques based on deep-learning models, the stage of training the deep-learning models is usually quite time-consuming. Taking the well-known object detection technique "You Only Look Once: Unified, Real-Time Object Detection, Joseph Redmon, Santosh Divvala, Ross Girshick and Ali Farhadi" as an example, it has a defect that positioning errors are likely to occur when the size difference of detected objects is large. Besides, in a loss function of training the deep-learning model of the above object detection technique, the training of the deep-learning model can be completed only by performing convergence on five parameters (i.e., "x-axis" and "y-axis" coordinates of a bounding box, the width and height of the bounding box, and a confidence score of whether an object is included in the bounding box) after excluding the part of object-category identification, which is quite time-consuming and consumes a lot of computing resources. Accordingly, it is important in the art to provide a relatively simple and time-saving method for generating an object-detecting model.

SUMMARY

Provided is a computing device for generating an object-detecting model. The computing device may comprise a storage and a processor electrically connected with the storage. The storage may store a training image and a corresponding image-marking data. The training image may include a training object, and the image-marking data may include a piece of location information of the training object in the training image. The processor may divide the training image into a plurality of training blocks. Next, for each of the training blocks, the processor may calculate a correct confidence score of the training object covering the training block according to the image-marking data and a confidence-score-translating function. Thereafter, the processor may train a deep-learning model with the training image, the correct confidence scores and the image-marking data to generate the object-detecting model.

Also provided is a method for generating an object-detecting model. The method may comprise the following steps:

dividing a training image into a plurality of training blocks by a computing device, wherein the training image includes a training object;

for each of the training blocks, calculating a correct confidence score of the training object covering the training block by the computing device according to an image-marking data and a confidence-score-translating function, wherein the image-marking data includes a piece of location information of the training object in the training image; and training, by the computing device, a deep-learning model with the training image, the correct confidence scores and the image-marking data to generate the object-detecting model.

Further provided is an object-detecting device. The object-detecting device may comprise a storage and a processor electrically connected with the storage. The storage may store an object-detecting model. The processor may generate the object-detecting model. In addition, the processor may divide an image into a plurality of blocks through the object-detecting model. Next, for each of the blocks, the processor may calculate a confidence score of a target object covering the block through the object-detecting model. The processor may further determine a closed window including the target object according to the blocks and the confidence scores. Thereafter, the processor may determine a detected position of the target object in the image according to the closed window.

Different from the traditional training method of the object-detecting model, the computing device that generates the object-detecting model calculates confidence scores for a plurality of blocks in the image through the confidence-score-translating function, and trains a deep-learning model with the confidence scores. Due to the confidence-score-translating function, the loss function of the deep-learning model only needs to perform convergence on the confidence scores, hence it is apparent that less time and resources are consumed as compared to the traditional method of training the object-detecting model.

The aforesaid content is not intended to limit the present invention, but merely describes the technical problems that can be solved by the present invention, the technical means that can be adopted, and the technical effects that can be achieved, so that people having ordinary skill in the art can basically understand the present invention. People having ordinary skill in the art can understand the various embodiments of the present invention according to the attached figures and the contents recited in the following embodiments.

DETAILED DESCRIPTION

The exemplary embodiments described below are not intended to limit the present invention to any specific environment, example, embodiment, applications, structures, processes or steps as described in these example embodiments. In the attached figures, elements not directly related to the present invention are omitted from depiction. In the attached figures, dimensional relationships among individual elements in the attached drawings are merely examples but not to limit the actual scale. Unless otherwise described, the same (or similar) element symbols may correspond to the same (or similar) elements in the following description. Unless otherwise described, the number of each element described below may be one or more under implementable circumstances.

Figure 1:
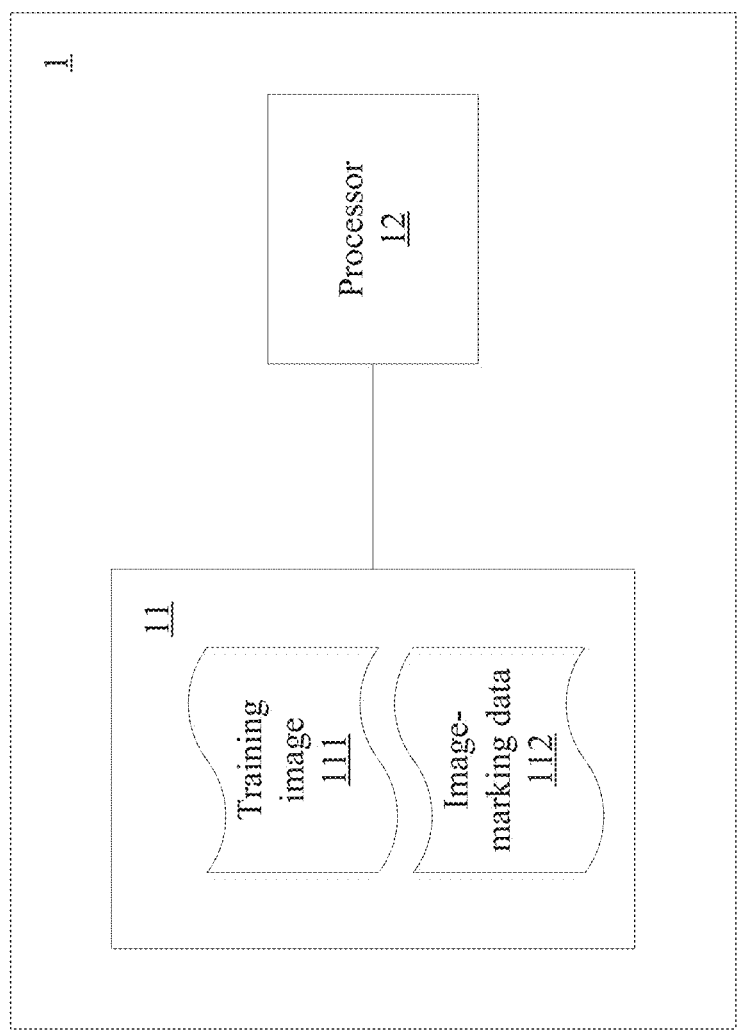
FIG. 1 illustrates a schematic view of a computing device for generating an object-detecting model according to one or more embodiments of the present invention.

Referring to FIG. 1, a computing device 1 comprises a storage 11 and a processor 12 electrically connected to the storage 11. The electrical connection between the storage 11 and the processor 12 may be direct (i.e., the mutual connection is achieved without using other elements) or indirect (i.e., the mutual connection is achieved through other elements). In some embodiments, the computing device 1 may be an image processing device with computing and storage capabilities, which is for example an image processing computer, a smart phone, a tablet computer, an air camera, a computer for traffic flow monitoring or the like, without being limited thereto.

The storage 11 may be configured to store data generated by the computing device 1, data transmitted from an external device, or data input by a user. The storage 11 may comprise a first-level memory (also referred to as main memory or internal memory), and the processor 12 may directly read instruction sets stored in the first-level memory, and execute these instruction sets if needed. The storage 11 may optionally comprise a second-level memory (also referred to as external memory or secondary memory), and the second-level memory may transmit the stored data to the first-level memory through the data buffer. For example, the secondary memory may for example be a hard disk, a compact disk or the like, without being limited thereto. The storage 11 may optionally comprise a third-level memory, i.e., a storage device that can be inserted into or pulled out from a computer directly, e.g., a mobile disk.

The processor 12 may be a microprocessor or microcontroller capable of signal processing and/or image processing or the like. A microprocessor or a microcontroller is a programmable special integrated circuit that has the functions of operation, storage, output/input, etc., and can accept and process various coding instructions, thereby performing various logic operations and arithmetic operations, and outputting the corresponding operation result. The processor 12 may be programmed to execute various instructions to process data in the computing device 1 and execute various operational procedures or programs.

The storage 11 may be configured to store a training data set that may be used to train a deep-learning model, and the training data set may comprise at least a training image 111 and an image-marking data 112. In some embodiments, the storage 11 may also be configured to store the deep-learning model so that the processor 12 can train the deep-learning model into an object-detecting model. The deep-learning model may be for example a model having an architecture of a convolutional neural network (CNN), without being limited thereto.

Figure 2A:
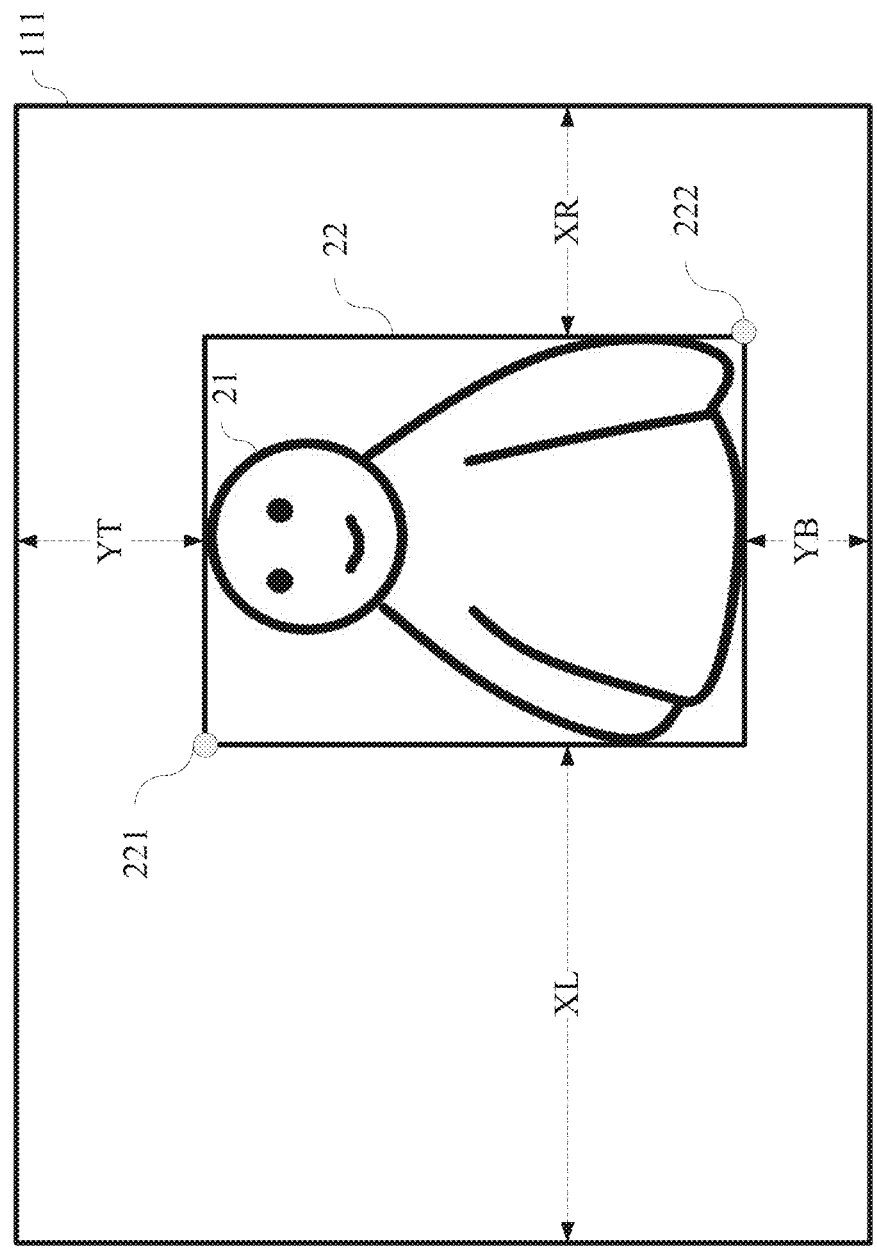
FIG. 2A illustrates a schematic view of a training image according to one or more embodiments of the present invention.

Referring to FIG. 1 and FIG. 2A together, the training image 111 may include a training object 21 therein. The training object 21 is an object that should be successfully detected in the training image 111 (i.e., a foreground object) when training the deep-learning model. The image-marking data 112 may comprise a piece of location information of the training object 21 in the training image 111. Through the location information, the processor 12 may learn a location of the training object 21 relative to the training image 111 and use the correct location as a basis for training the deep-learning model. For example, the location information may comprise at least coordinate information of a rectangle box 22 surrounding the training object 21, and the coordinate information may comprise a distance XL between the rectangle box 22 and a left boundary of the training image 111, a distance XR between the rectangle box 22 and a right boundary of the training image 111, a distance YT between the rectangle box 22 and an upper boundary of the training image 111, and a distance YB between the rectangle box 22 and a lower boundary of the training image 111. For some embodiments, the coordinate information of the rectangle box 22 may be used to represent the location of the training object 21.

Figure 2B:
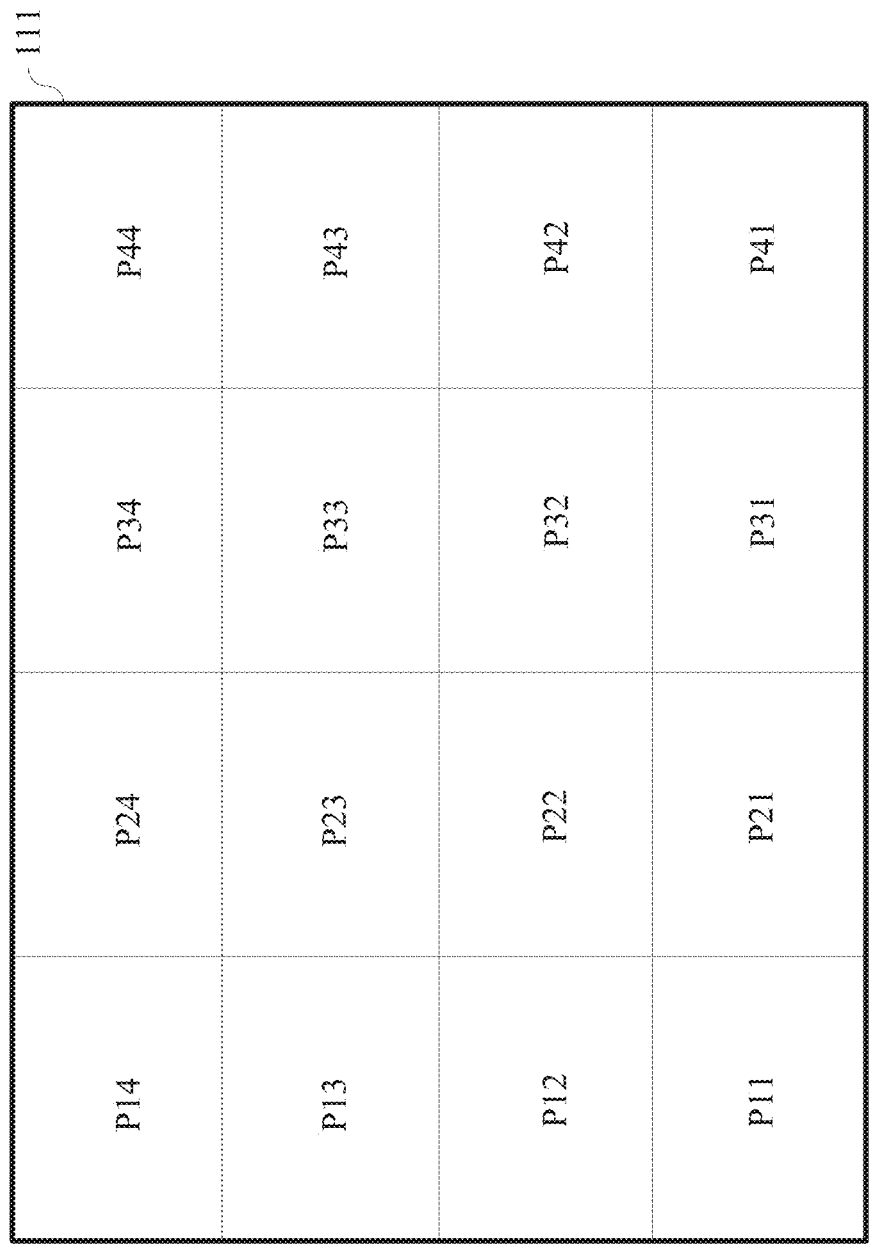
FIG. 2B illustrates a schematic view of dividing a training image into a plurality of training blocks by a computing device, according to one or more embodiments of the present invention.

Referring to FIG. 1 and FIG. 2A to FIG. 2B together, the processor 12 may be used to divide the training image 111 into a plurality of training blocks. For example, when a cut precision is four, the processor 12 may divide the width and height of the training image 111 into four equal parts according to the cut precision, thereby generating sixteen training blocks P11, P12, . . . , P14, P21, P22, . . . , P44. In some embodiments, the cut precision may be provided by a user and stored in the storage 11.

Figure 2C:
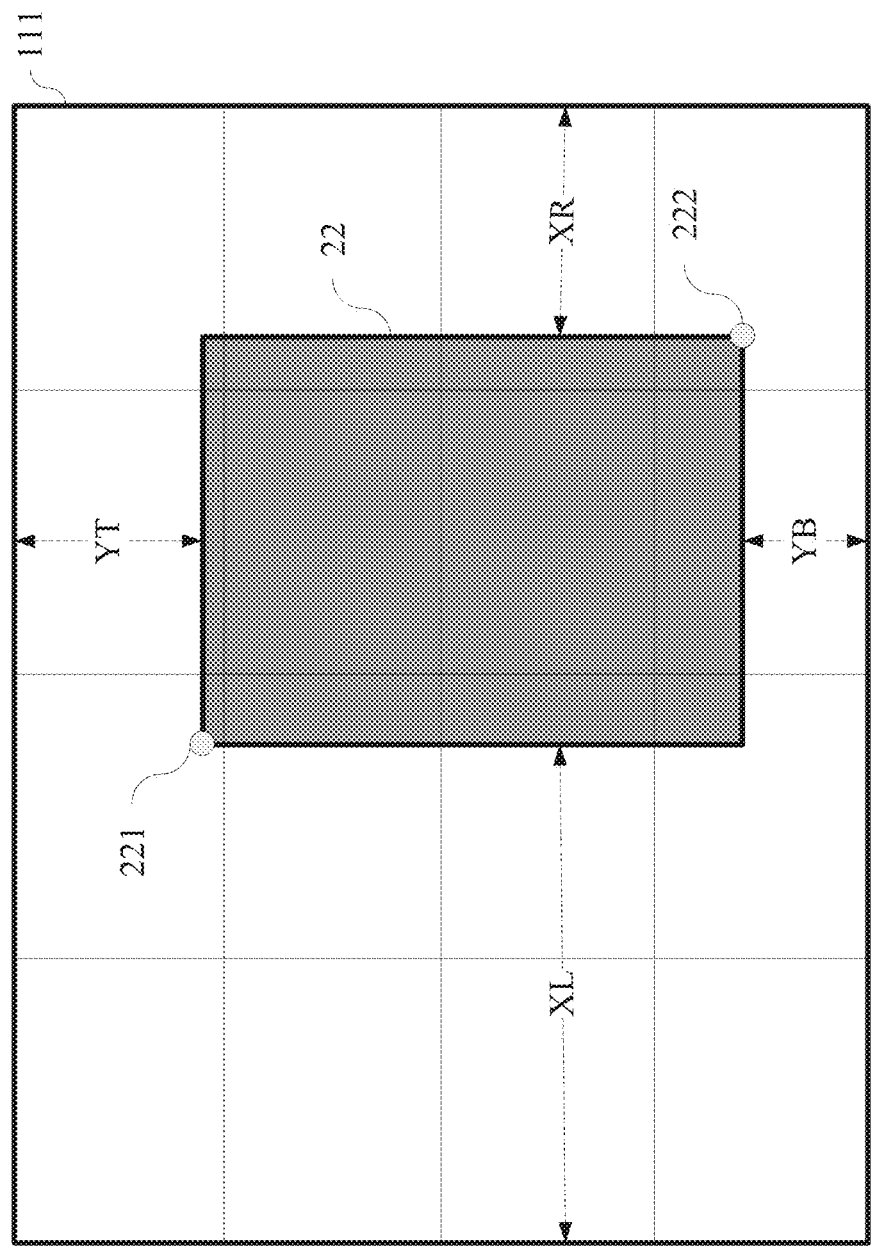
FIG. 2C illustrates a schematic view in which a target object in a training image covers a plurality of blocks as shown in FIG. 2B, according to one or more embodiments of the present invention.
Figure 3A:
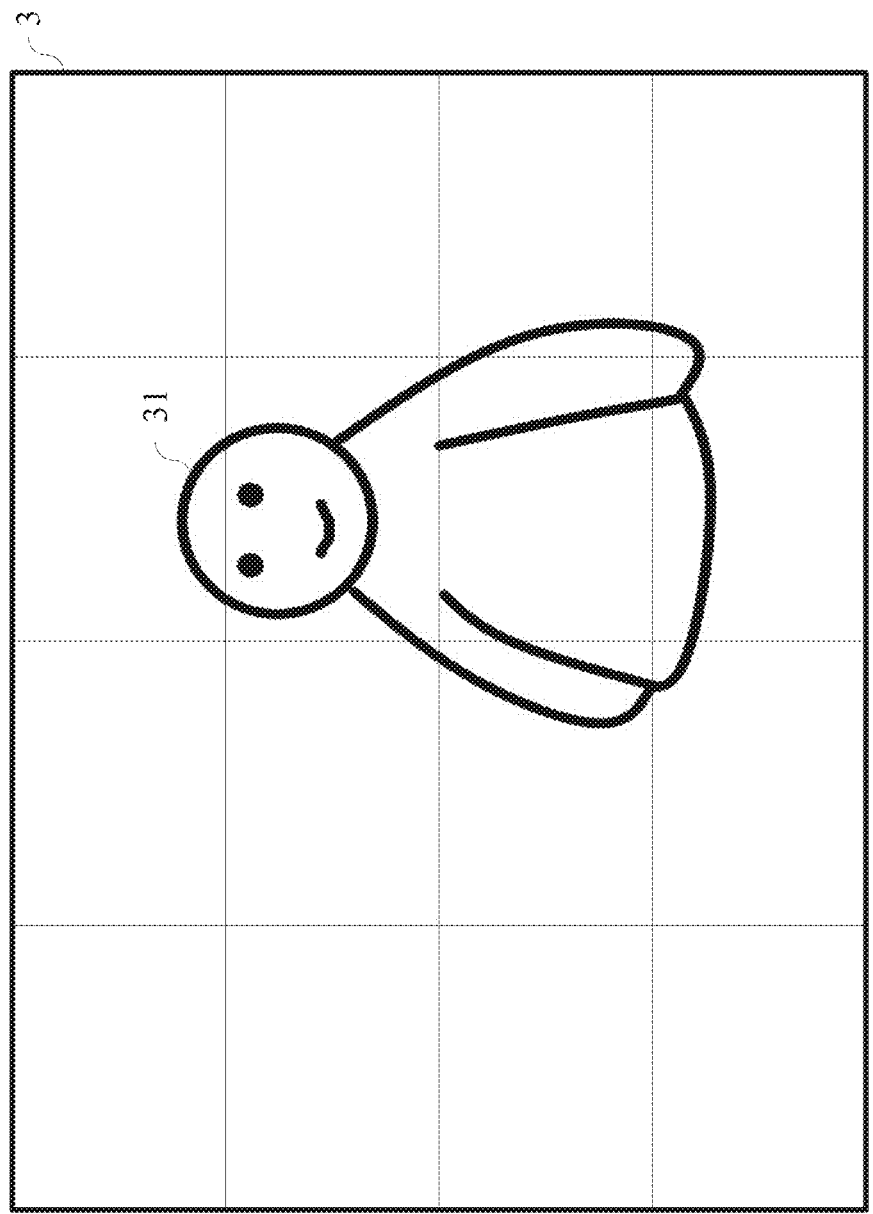
FIG. 3A illustrates a schematic view of dividing an image into a plurality of blocks by an object-detecting device, according to one or more embodiments of the present invention.
Figure 3B:
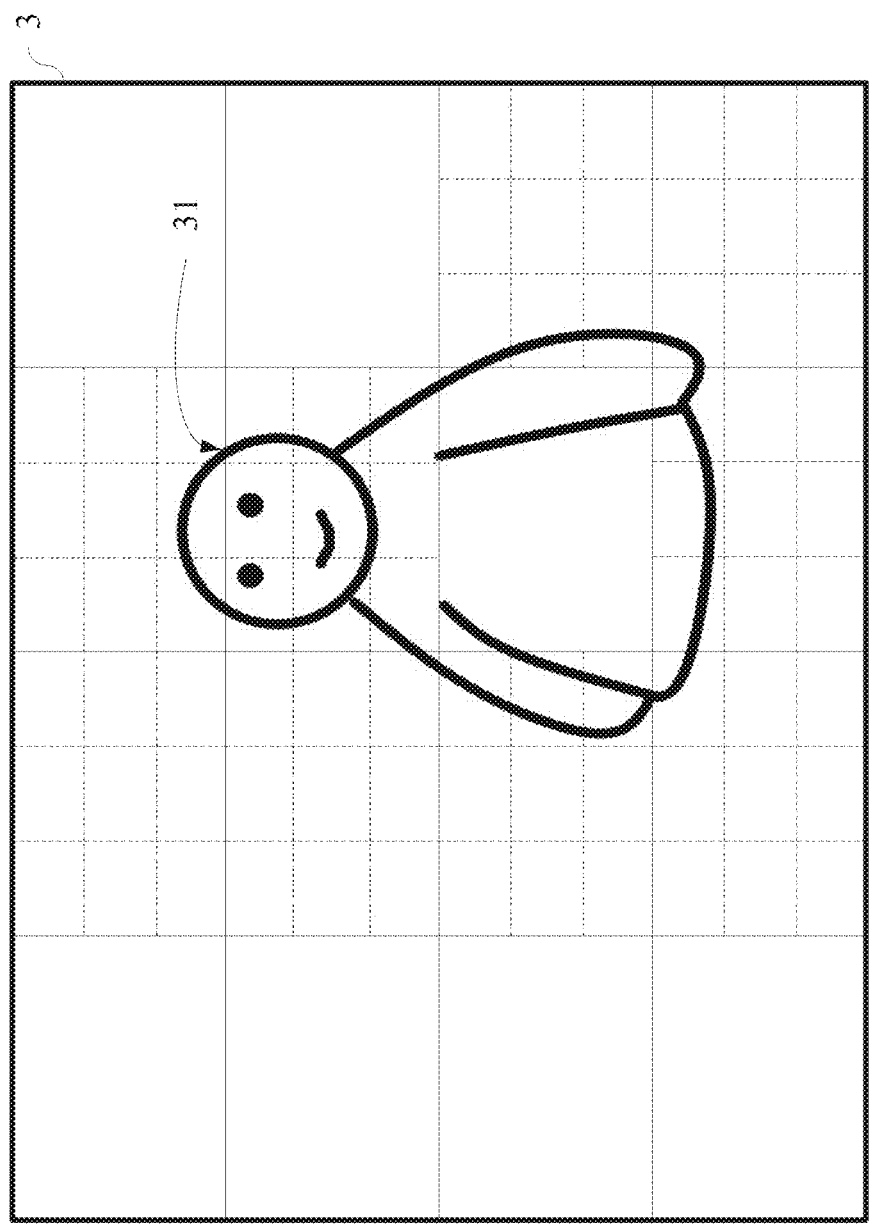
FIG. 3B illustrates a schematic view of further dividing each of a plurality of edge blocks into a plurality of blocks by an object-detecting device, according to one or more embodiments of the present invention.
Figure 3C:
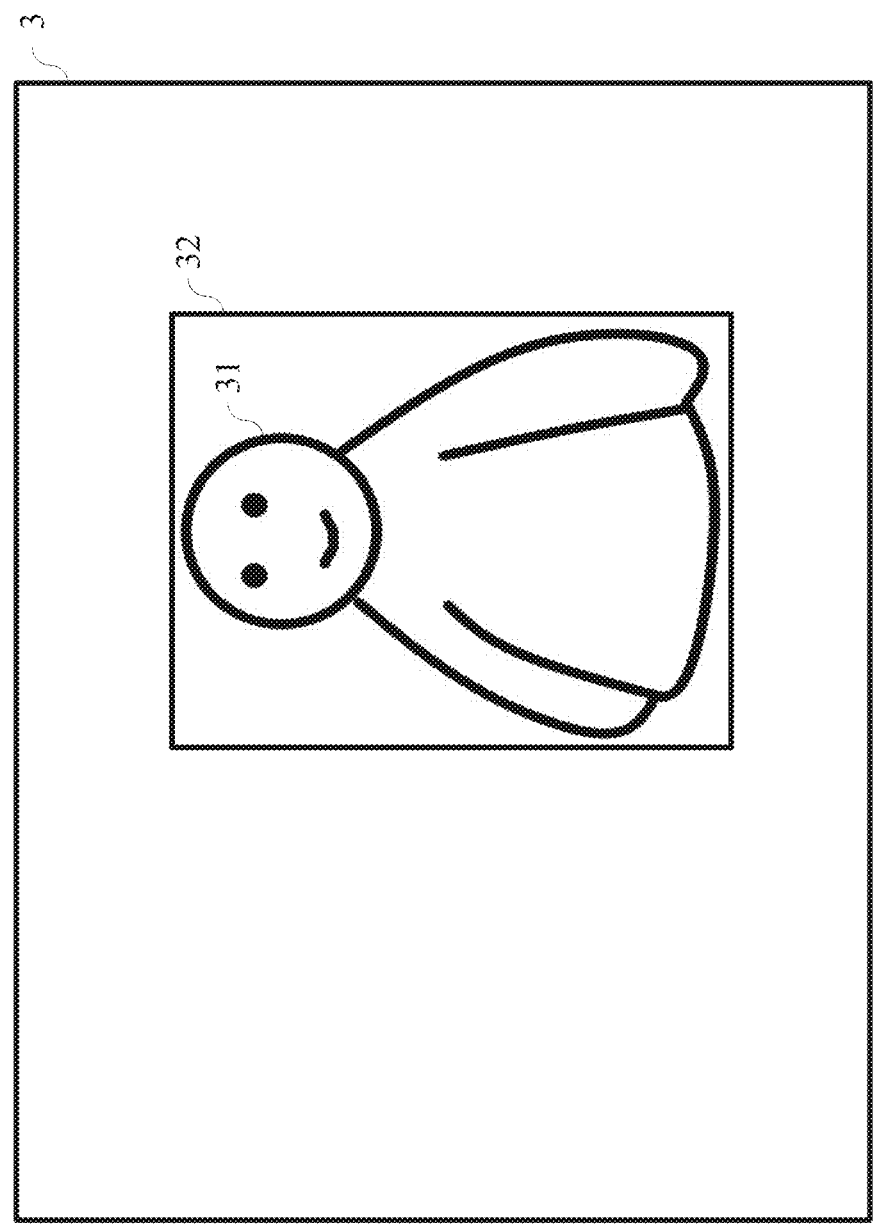
FIG. 3C illustrates a schematic view of obtaining an enclosed window including the target object by an object-detecting model, according to one or more embodiments of the present invention.

As shown in FIG. 2C, the training blocks in FIG. 2C may completely correspond to the training blocks P11, P12, . . . , P14, P21, P22, . . . , P44 shown in FIG. 2B. However, for the sake of simplicity of illustration, reference numerals are not marked for the training blocks in FIG. 2C. In addition, since the location information of the rectangle box 22 may represent the location of the training object 21, the training object 21 is not depicted in FIG. 2C.

Referring to FIG. 1 and FIG. 2A to FIG. 2C together, after dividing the training image 111 into a plurality of training blocks (i.e., training blocks P11, P12, . . . , P44), the processor 12 may also be used to calculate, for each of the training blocks, a correct confidence score of the training object 21 covering the training block. The correct confidence score may represent the correct confidence score that the deep-learning model should eventually infer for each of the training blocks when training the deep-learning model. That is, if there is still a difference between the confidence score predicted by the deep-learning model for each of the training blocks and each of the correct confidence scores, it means that the training of the deep-learning model has not been completed yet, so the processor 12 still needs to adjust the parameters of the deep-learning model to make the predicted confidence score conform to each of the correct confidence scores. In some embodiments, each of the correct confidence scores is a real number between zero and one and may be used to represent probability.

Specifically, in some embodiments, the processor 12 may calculate the correct confidence score of the training object 21 covering each of the training blocks according to the coordinate information of the rectangle box 22 in the image-marking data 112 and through a confidence-score-translating function. The confidence-score-translating function may be as shown in the Equation 1 below:

$$C_{i,j} = \begin{cases} 0, & \begin{array}{l} x_{left} > (i+1) \times (W_{unit}) \\ y_{top} > (j+1) \times (H_{unit}) \\ x_{right} < i \times (W_{unit}) \\ y_{bottom} < j \times (H_{unit}) \end{array} \\ [\min((i+1) \times W_{unit}, x_{right}) - \max(i \times W_{unit}, x_{left})] \times \\ \quad [\min((j+1) \times H_{unit}, y_{bottom}) - \\ \quad \max(j \times H_{unit}, y_{top})] \div (W_{unit} \times H_{unit}), \text{ otherwise} \end{cases}$$ ⟨Equation 1⟩

In the equation 1, "$C_{i,j}$" represents the correct confidence scores corresponding to the training blocks. For example, $C_{1,1}$ represents the correct confidence score corresponding to the training block P11, $C_{1,2}$ represents the correct confidence score corresponding to the training block P12, and so on. "$x_{left}$" represents a distance between a leftmost point 221 of the rectangle box 22 and a left boundary of the training image 111, i.e., the distance XL. "$y_{top}$" represents a distance between an uppermost point 221 of the rectangle box 22 and an upper boundary of the training image 111, i.e., the distance YT. "$x_{right}$" represents a distance between a rightmost point 222 of the rectangle box 22 and a right boundary of the training image 111, i.e., the distance XR. "$y_{bottom}$" represents a distance between a lowermost point 222 of the rectangle box 22 and a lower boundary of the training image 111, i.e., the distance YB. "$W_{unit}$" represents a ratio of a width of the training image 111 to the cut precision; and "$H_{unit}$" represents a ratio of a height of the training image 111 to the cut precision.

Through the confidence-score-translating function as shown in Equation 1, the processor 12 may calculate the correct confidence scores for the training blocks P11, P12, . . . , P14, P21, P22, . . . , P44 according to the location information of the rectangle box 22. Specifically, the processor 12 may calculate the correct confidence scores for the training blocks P11, P12, P13 and P14 through the confidence-score-translating function and learn that the correct confidence scores thereof are all zero, which means that the rectangle box 22 does not cover the training blocks P11, P12, P13 and P14. Similarly, the processor 12 may calculate the correct confidence scores for the training blocks P32 and P33 through the confidence-score-translating function and learn that the correct confidence scores thereof are all one, which means that the rectangle box 22 covers the whole training blocks P32 and P33. On the other hand, the processor 12 may calculate the correct confidence scores for the training blocks P21, P22, P23, P24, P31, P34, P41, P42, P43, and P44 and learn that the correct confidence scores thereof are not zero or one and are real numbers between zero and one, which means that the rectangle box 22 does not completely cover the training blocks P21, P22, P23, P24, P31, P34, P41, P42, P43, and P44. In other words, the training blocks P21, P22, P23, P24, P31, P34, P41, P42, P43, and P44 are the training blocks including the edge portions of the rectangle box 22. In some embodiments, each of the training blocks P21, P22, P23, P24, P31, P34, P41, P42, P43, and P44 may be defined as an edge training block.

After the calculation of the correct confidence scores is completed, the processor 12 may train the deep-learning model with the training images 111, the correct confidence scores and the image-marking data 112, thereby generating the object-detecting model.

Specifically, in some embodiments, when the deep-learning model is trained with the training images 111, the correct confidence scores and the image-marking data 112, the processor 12 may be used to calculate a predicted confidence score through the deep-learning model for each of the training blocks. The predicted confidence scores may represents that the deep-learning model predicts the confidence score of the rectangle box 22 covering each of the training blocks according to the current parameter settings thereof, and similar to the correct confidence scores, each of the predicted confidence scores may also be a real number between zero and one.

After obtaining the predicted confidence scores, the processor 12 may calculate an error between each of the predicted confidence scores and the corresponding correct confidence score to determine the training degree of the deep-learning model based on the errors, thereby determining how to adjust the parameters of the deep-learning model. In some embodiments, the processor 12 may calculate the errors according to the Equation 2 below:

$$\text{loss}_{i,j} = (C_{i,j} - \widetilde{C_{i,j}})^2$$ ⟨Equation 2⟩

In the Equation 2, "$\text{loss}_{i,j}$" represents the errors corresponding to the training blocks; and "$\widetilde{C_{i,j}}$" represents the predicted confidence scores corresponding to the training blocks.

After obtaining the errors, the processor 12 may adjust the parameters of the deep-learning model according to the errors. However, for the processor 12, it is often more difficult to adjust the edge training blocks than to adjust the non-edge training blocks (i.e., more adjustments are required than that of the non-edge training blocks). Accordingly, when calculating the errors, for the training blocks corresponding to the predicted confidence scores that are not zero (i.e., the processor 12 infers through the deep-learning model that the training blocks are located at the edge portions of the rectangle box 22), the processor 12 may additionally adjust the corresponding errors through an edge emphasis function, and the adjustment amplitude of the edge emphasis function for the error corresponding to the smaller predicted confidence score (i.e., the block that may be located at the portion closer to the edge) is larger so as to particularly emphasize the error of the edge region.

In some embodiments, the edge emphasis function may be to take a square root of an inverse of each of the correct confidence scores. Therefore, by combining the errors adjusted by the edge emphasis function with the Equation 2, a loss function for training the deep-learning model may be constructed as shown in the Equation 3 below:

$$\text{loss}_{i,j} = \begin{cases} \sqrt{\dfrac{1}{C_{i,j}}} \times (C_{i,j} - \widetilde{C_{i,j}})^2, & C_{i,j} \neq 0 \\ (C_{i,j} - \widetilde{C_{i,j}})^2, & \text{otherwise} \end{cases}$$ ⟨Equation 3⟩

The processor 12 may complete the parameter adjustment of the deep-learning model by continuously calculating the errors based on the above-mentioned methods and accordingly adjusting the parameters of the deep-learning model until the predicted confidence scores inferred by the deep-learning model coincide with the correct confidence scores or the errors therebetween are within a range of threshold values, thereby obtaining the object-detecting model. The parameter adjustment of the deep-learning model through the loss function shall be appreciated by those of ordinary skill in the art, and thus will not be further described herein.

In the above embodiments provided by the present invention for training the deep-learning model to generate the object-detecting model, the training of the deep-learning model can be accomplished simply by performing the convergence on one parameter (i.e., the confidence score), so the defect in the prior art that is caused by the need of performing the convergence on too many parameters can be solved.

Referring to FIG. 1A, FIG. 3A, FIG. 3B, and FIG. 3C together, in some embodiments, the computing device 1 for generating the object-detecting model may be implemented as an object-detecting device. That is, the object-detecting device may comprise a storage 11 and a processor 12. The processor 12 may generate the object-detecting model, and the storage 11 may also be used to store the object-detecting model in addition to the training image 111 and the image-marking data 112. Since the object-detecting device is implemented by the computing device 1, the object-detecting device may comprise all the above-mentioned embodiments regarding the generation of the object-detecting model by the computing device 1, and thus will not be further described herein.

The processor 12 may be configured to perform object detection for an image 3 through the object-detecting model, wherein the image 3 may comprise a target object 31, and the target object 31 is an object that should be detected by the processor 12 through the object-detecting model. Specifically, the processor 12 may divide the image into a plurality of blocks through the object-detecting model (i.e., step (a)). Next, for each of the blocks, the processor 12 may calculate a confidence score of the target object 31 covering the block through the object-detecting model (i.e., step (b)). In some embodiments, the confidence scores are similar to the correct confidence scores, may also be real numbers between zero and one, and may represent a probability of covering the blocks by the target object 31 that is inferred by the processor 12 through the object-detecting model. After the calculation of the confidence scores is completed, the processor 12 may determine a closed window 32 including the target object 31 according to the blocks and the confidence scores (i.e., step (c)), and may determine a detected position of the target object in the image according to the location information of the closed window 32 (i.e., step (d)).

More specifically, in some embodiments, after the confidence scores have been calculated at the step (b), the processor 12 may determine a plurality of edge blocks covering the target object 31 according to the blocks and the confidence scores (i.e., step (c1)). The confidence scores corresponding to the edge blocks are not zero or one, which means that the processor 12 infers via the object-detecting model that the edge blocks are not fully covered by the target object 31, that is, the edge blocks cover the edge portions of the target object 31.

After determining the edge blocks for the first time, the closed window 32 surrounding the target object 31 may be determined directly according to the edge blocks. However, in order to detect the position of the target object 31 in the image 3 more accurately, the processor 12 may further iteratively perform the step (a), the step (b) and the step (c1) for each of the edge blocks until none of the confidence scores corresponding to the blocks divided by the edge block is zero, or a distribution of the confidence scores corresponding to the blocks divided by the edge block is the same as the result of the previous iteration (i.e., step (c2)). This iterative edge-block determination may make the edge detection result of the object-detecting model for the target object 31 finer. After completing the edge block determination of the step (c2), the processor 12 may determine the closed window 32 based on the blocks corresponding to the confidence scores that are not zero (i.e., step (c3)).

In some embodiments, each iteration in the step (c2) may perform the step (a) according to different cut precision. In other words, the number of the plurality of blocks divided in the step (a) of each iteration may be different.

Through the iterative edge correction of the closed window 32 provided in the steps (c1) to (c3), when there are a plurality of target objects 31 in the image 3 and the size difference thereof is large, the object-detecting model may still perform the edge block determination for each of the target objects, thereby solving the defect in the prior art that positioning errors are likely to occur for the above situations.

Figure 4:
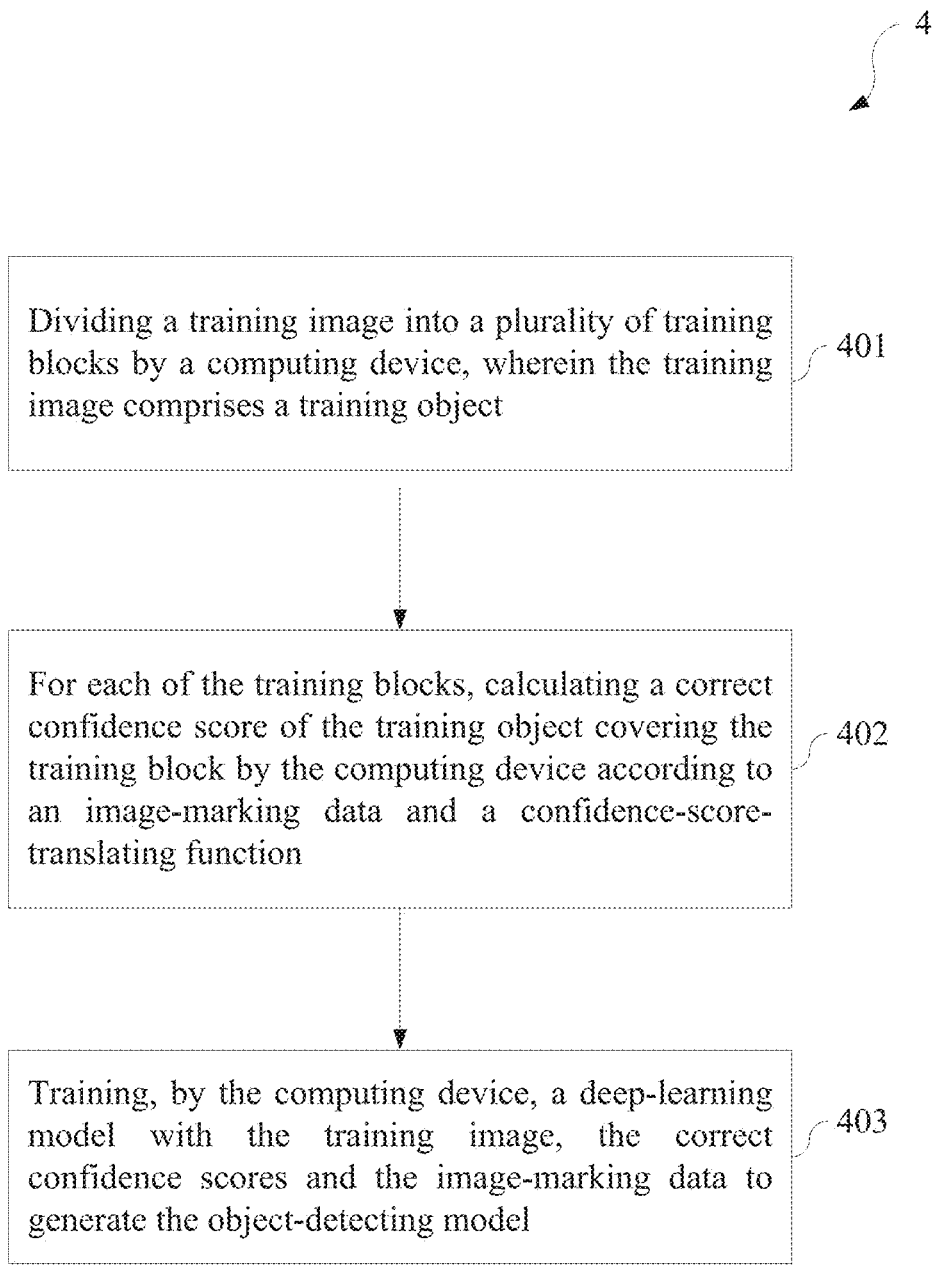
FIG. 4 illustrates a schematic view of a method for generating an object-detecting model according to one or more embodiments of the present invention.

Referring to FIG. 4, a method 4 for generating an object-detecting model may comprise the following steps:
dividing a training image into a plurality of training blocks by a computing device, wherein the training image comprises a training object (marked as 401);
for each of the training blocks, calculating a correct confidence score of the training object covering the training block by the computing device according to an image-marking data and a confidence-score-translating function (marked as 402), wherein the image-marking data includes a piece of location information of the training object in the training image; and
training, by the computing device, a deep-learning model with the training image, the correct confidence scores and the image-marking data to generate the object-detecting model (marked as 403).

In some embodiments, regarding the method 4 for generating the object-detecting model, the computing device divides the training image into the training blocks according to the cut precision, and the cut precision is provided by a user of the computing device.

In some embodiments, when training the deep-learning model, the method 4 for generating the object-detecting model further comprises the following steps:
calculating a predicted confidence score for each of the training blocks by the computing device, wherein both the predicted confidence scores and the correct confidence scores are real numbers between zero and one;
calculating an error between each of the predicted confidence scores and each corresponding correct confidence score by the computing device;
adjusting the corresponding error through an edge emphasis function for each of the predicted confidence scores that are not zero by the computing device, wherein the edge emphasis function adjusts the error corresponding to the smaller predicted confidence score to a greater extent; and
adjusting the deep-learning model according to the errors by the computing device.

In some embodiments, regarding the method 4 for generating the object-detecting model, the location information comprises coordinate information of a rectangle box surrounding the training object in the training image, and the confidence-score-translating function is as shown in the aforesaid Equation 1, wherein "$C_{i,j}$" is the correct confidence scores; "$x_{left}$" is a distance between a leftmost point of the rectangle box and a left boundary of the training image; "$y_{top}$" is a distance between an uppermost point of the rectangle box and an upper boundary of the training image; "$x_{right}$" is a distance between a rightmost point of the rectangle box and a right boundary of the training image; "$y_{bottom}$" is a distance between a lowermost point of the rectangle box and a lower boundary of the training image; "$W_{unit}$" is a ratio of a width of the training image to a cut precision; and "$H_{unit}$" is a ratio of a height of the training image to the cut precision.

In some embodiments, the method 4 for generating the object-detecting model may further comprise the following steps:
  calculating a predicted confidence score for each of the training blocks by the computing device, wherein the predicted confidence scores and the correct confidence scores are all real numbers between zero and one;
  calculating an error between each of the predicted confidence scores and each corresponding correct confidence score by the computing device;
  adjusting the corresponding error through an edge emphasis function for each of the predicted confidence scores that are not zero by the computing device, wherein the edge emphasis function adjusts the error corresponding to the smaller predicted confidence score to a greater extent, and the edge emphasis function is to take a square root of an inverse of each of the correct confidence scores; and
  adjusting the deep-learning model by the computing device according to the errors.

In some embodiments, the method 4 for generating an object-detecting model may be performed by the computing device 1. Other corresponding embodiments of the method 4 for generating the object-detecting model shall be clearly appreciated by those of ordinary skill in the art based on the above description of the computing device 1, and thus will not be further described herein.

In some embodiments, an object-detecting method is adapted for use in an object-detecting device, wherein the object-detecting device generates and stores an object-detecting model. The object-detecting method may comprise the following steps:
  (a) dividing an image into a plurality of blocks by the object-detecting model;
  (b) for each of the blocks, calculating a confidence score of a target object covering the block by the object-detecting model, wherein each of the confidence scores is a real number between zero and one;
  (c) obtaining a closed window including the target object by the object-detecting model according to the blocks and the confidence scores; and
  (d) determining a detected position of the target object in the image by the object-detecting model according to the closed window.

In some embodiments, regarding the object-detecting method, the step (c) may further comprise the following steps:
  (c1) determining a plurality of edge blocks including the target object by the object-detecting model according to the blocks and the confidence scores, wherein the confidence scores corresponding to the edge blocks are not zero or one;
  (c2) iteratively performing the steps (a), (b) and (c1) for each of the edge blocks by the object-detecting model until none of the confidence scores corresponding to the blocks divided by the edge block is zero or a distribution of the confidence scores corresponding to the blocks divided by the edge block is the same as the result of the previous iteration; and
  (c3) determining the closed window by the object-detecting model based on the blocks corresponding to the confidence scores that are not zero.

In some embodiments, the object-detecting method may further comprise the following steps:
  dividing a training image into a plurality of training blocks by the object-detecting device, wherein the training image includes a training object;
  for each of the training blocks, calculating by the object-detecting device a correct confidence score of the training object covering the block according to an image-marking data and a confidence-score-translating function, wherein the image-marking data comprises a piece of location information of a rectangle box including the training object in the training image; and
  training a deep-learning model by the object-detecting device through each of the correct confidence scores and the image-marking data to generate the object-detecting model.

In some embodiments, regarding the object-detecting method, the object-detecting device divides the image into the blocks according to a cut precision, or divides the training image into the training blocks according to the cut precision.

In some embodiments, when training the deep-learning model, the object-detecting method may further comprise the following steps:
  calculating a predicted confidence score for each of the training blocks by the object-detecting device;
  calculating an error between each of the predicted confidence scores and each corresponding correct confidence score by the object-detecting device; and
  adjusting the corresponding error through an edge emphasis function for each of the predicted confidence scores that are not zero by the object-detecting device, wherein the edge emphasis function adjusts the error corresponding to the smaller predicted confidence score to a greater extent.

In some embodiments, regarding the object-detecting method, the confidence-score-translating function may be as shown in the aforesaid Equation 1, and "$C_{i,j}$" is the correct confidence scores; "$x_{left}$" is a distance between a leftmost point of the rectangle box and a left boundary of the training image; "$y_{top}$" is a distance between an uppermost point of the rectangle box and an upper boundary of the training image; "$x_{right}$" is a distance between a rightmost point of the rectangle box and a right boundary of the training image; "$y_{bottom}$" is a distance between a lowermost point of the rectangle box and a lower boundary of the training image; "$W_{unit}$" is a ratio of a width of the training image to a cut precision; and "$H_{unit}$" is a ratio of a height of the training image to the cut precision.

In some embodiments, when training the deep-learning model, the object-detecting method may further comprise the following steps:
  calculating a predicted confidence score for each of the training blocks by the object-detecting device;
  calculating an error between each of the predicted confidence scores and each corresponding correct confidence score by the object-detecting device;
  adjusting the corresponding error through an edge emphasis function for each of the predicted confidence scores that are not zero by the object-detecting device, wherein the edge emphasis function adjusts the error corresponding to the smaller predicted confidence score to a greater extent, and the edge emphasis function is to take a square root of an inverse of each of the correct confidence scores; and adjusting the deep-learning model according to the errors by the object-detecting device.

In some embodiments, the object-detecting method may be performed by the object-detecting device implemented by the computing device 1. Other corresponding embodiments of the object-detecting method shall be clearly appreciated by those of ordinary skill in the art based on the above description of the object-detecting device implemented by the computing device 1, and thus will not be further described herein.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A computing device for generating an object-detecting model, the computing device comprising:
    a storage, being configured to store a training image and a corresponding image-marking data, wherein the training image includes a training object, and the image-marking data includes a piece of location information of the training object in the training image; and
    a processor, being electrically connected with the storage, and being configured to:
        divide the training image into a plurality of training blocks;
        for each of the training blocks, calculate a correct confidence score of the training object covering the training block according to the image-marking data and a confidence-score-translating function; and
        train a deep-learning model with the training image, the correct confidence scores, and the image-marking data to generate the object-detecting model.

2. The computing device of claim 1, wherein the processor divides the training image into the training blocks according to a cut precision, and the cut precision is provided by a user of the computing device.

3. The computing device of claim 1, wherein during training the deep-learning model, the processor is further configured to:
    calculate a predicted confidence score for each of the training blocks, wherein both the predicted confidence scores and the correct confidence scores are real numbers between zero and one;
    calculate an error between each of the predicted confidence scores and each corresponding correct confidence score;
    adjust the corresponding error through an edge emphasis function for each of the predicted confidence scores that are not zero, wherein the edge emphasis function adjusts the error corresponding to the smaller predicted confidence score to a greater extent; and
    adjust the deep-learning model according to the errors.

4. The computing device of claim 2, wherein the location information comprises coordinate information of a rectangle box surrounding the training object in the training image, and the confidence-score-translating function is as follows:

$$C_{i,j} = \begin{cases} 0, & \begin{aligned} & x_{left} > (i+1) \times (W_{unit}) \\ & y_{top} > (j+1) \times (H_{unit}) \\ & x_{right} < i \times (W_{unit}) \\ & y_{bottom} < j \times (H_{unit}) \end{aligned} \\ [\min((i+1) \times W_{unit}, x_{right}) - \max(i \times W_{unit}, x_{left})] \times \\ [\min((j+1) \times H_{unit}, y_{bottom}) - \\ \max(j \times H_{unit}, y_{top})] \div (W_{unit} \times H_{unit}), & \text{otherwise} \end{cases}$$

wherein, "$C_{i,j}$" is the correct confidence scores; "$x_{left}$" is a distance between a leftmost point of the rectangle box and a left boundary of the training image; "$y_{top}$" is a distance between an uppermost point of the rectangle box and an upper boundary of the training image; "$x_{right}$" is a distance between a rightmost point of the rectangle box and a right boundary of the training image; "$y_{bottom}$" is a distance between a lowermost point of the rectangle box and a lower boundary of the training image; "$W_{unit}$" is a ratio of a width of the training image to the cut precision; and "$H_{unit}$" is a ratio of a height of the training image to the cut precision.

5. The computing device of claim 3, wherein the edge emphasis function is to take a square root of an inverse of each of the correct confidence scores.

6. A method for generating an object-detecting model, comprising:
    dividing a training image into a plurality of training blocks by a computing device, wherein the training image includes a training object;
    for each of the training blocks, calculating a correct confidence score of the training object covering the training block by the computing device according to an image-marking data and a confidence-score-translating function, wherein the image-marking data includes a piece of location information of the training object in the training image; and
    training, by the computing device, a deep-learning model with the training image, the correct confidence scores and the image-marking data to generate the object-detecting model.

7. The method of claim 6, wherein the computing device divides the training image into the training blocks according to a cut precision, and the cut precision is provided by a user of the computing device.

8. The method of claim 6, further comprising the following steps when training the deep-learning model:
    calculating a predicted confidence score for each of the training blocks by the computing device, wherein both the predicted confidence scores and the correct confidence scores are real numbers between zero and one;
    calculating an error between each of the predicted confidence scores and each corresponding correct confidence score by the computing device;
    adjusting the corresponding error through an edge emphasis function for each of the predicted confidence scores that are not zero by the computing device, wherein the edge emphasis function adjusts the error corresponding to the smaller predicted confidence score to a greater extent; and
    adjusting the deep-learning model according to the errors by the computing device.

9. The method of claim 7, wherein the location information comprises coordinate information of a rectangle box surrounding the training object in the training image, and the confidence-score-translating function is as follows:

$$C_{i,j} = \begin{cases} 0, & \begin{array}{l} x_{left} > (i+1) \times (W_{unit}) \\ y_{top} > (j+1) \times (H_{unit}) \\ x_{right} < i \times (W_{unit}) \\ y_{bottom} < j \times (H_{unit}) \end{array} \\ [\min((i+1) \times W_{unit}, x_{right}) - \max(i \times W_{unit}, x_{left})] \times \\ [\min((j+1) \times H_{unit}, y_{bottom}) - \\ \max(j \times H_{unit}, y_{top})] \div (W_{unit} \times H_{unit}), \text{ otherwise} \end{cases} ;$$

wherein, "$C_{i,j}$" is the correct confidence scores; "$x_{left}$" is a distance between a leftmost point of the rectangle box and a left boundary of the training image; "$y_{top}$" is a distance between an uppermost point of the rectangle box and an upper boundary of the training image; "$x_{right}$" is a distance between a rightmost point of the rectangle box and a right boundary of the training image; "$y_{bottom}$" is a distance between a lowermost point of the rectangle box and a lower boundary of the training image; "$W_{unit}$" is a ratio of a width of the training image to the cut precision; and "$H_{unit}$" is a ratio of a height of the training image to the cut precision.

10. The method of claim 8, wherein the edge emphasis function is to take a square root of an inverse of each of the correct confidence scores.

11. An object-detecting device, comprising:
a storage, being configured to store an object-detecting model; and
a processor, being electrically connected with the storage, and being configured to generate the object-detecting model and perform the following steps:
(a) dividing an image into a plurality of blocks through the object-detecting model;
(b) for each of the blocks, calculating a confidence score of a target object covering the block through the object-detecting model;
(c) determining a closed window including the target object according to the blocks and the confidence scores; and
(d) determining a detected position of the target object in the image according to the closed window;
wherein the confidence scores are real numbers between zero and one, and when determining the closed window, the processor performs the following steps:
(c1) determining a plurality of edge blocks covering the target object according to the blocks and the confidence scores, wherein the confidence scores corresponding to the edge blocks are not zero or one;
(c2) iteratively performing the steps (a), (b) and (c1) for each of the edge blocks until none of the confidence scores corresponding to the blocks divided by the edge block is zero; and
(c3) determining the closed window based on the blocks corresponding to the confidence scores that are not zero.

12. The object-detecting device of claim 11, wherein during the process of generating the object-detecting model, the processor is further configured to:
divide a training image into a plurality of training blocks, wherein the training image includes a training object;
for each of the training blocks, calculate a correct confidence score of the training object covering the training block according to an image-marking data and a confidence-score-translating function, wherein the image-marking data comprises a piece of location information of the training object in the training image; and
train a deep-learning model with the training image, the correct confidence scores and the image-marking data to generate the object-detecting model.

13. The object-detecting device of claim 11, wherein the processor divides the image into the blocks according to a cut precision, and the cut precision is provided by a user of the object-detecting device.

14. The object-detecting device of claim 12, wherein the processor divides the image into the blocks according to a cut precision, or divides the training image into the training blocks according to the cut precision, and the cut precision is provided by a user of the object-detecting device.

15. The object-detecting device of claim 12, wherein during the process of training the deep-learning model, the processor is further configured to:
calculate a predicted confidence score for each of the training blocks;
calculate an error between each of the predicted confidence scores and each corresponding correct confidence score;
adjust the corresponding error through an edge emphasis function for each of the predicted confidence scores that are not zero, wherein the edge emphasis function adjusts the error corresponding to the smaller predicted confidence score to a greater extent; and
adjust the deep-learning model according to the errors.

16. The object-detecting device of claim 12, wherein the location information comprises coordinate information of a rectangle box surrounding the training object in the training image, and the confidence-score-translating function is as follows:

$$C_{i,j} = \begin{cases} 0, & \begin{array}{l} x_{left} > (i+1) \times (W_{unit}) \\ y_{top} > (j+1) \times (H_{unit}) \\ x_{right} < i \times (W_{unit}) \\ y_{bottom} < j \times (H_{unit}) \end{array} \\ [\min((i+1) \times W_{unit}, x_{right}) - \max(i \times W_{unit}, x_{left})] \times \\ [\min((j+1) \times H_{unit}, y_{bottom}) - \\ \max(j \times H_{unit}, y_{top})] \div (W_{unit} \times H_{unit}), \text{ otherwise} \end{cases} ;$$

wherein, "$C_{i,j}$" is the correct confidence scores; "$x_{left}$" is a distance between a leftmost point of the rectangle box and a left boundary of the training image; "$y_{top}$" is a distance between an uppermost point of the rectangle box and an upper boundary of the training image; "$x_{right}$" is a distance between a rightmost point of the rectangle box and a right boundary of the training image;

"$y_{bottom}$" is a distance between a lowermost point of the rectangle box and a lower boundary of the training image; "$W_{unit}$" is a ratio of a width of the training image to a cut precision; and "$H_{unit}$" is a ratio of a height of the training image to the cut precision.

17. The object-detecting device of claim 14, wherein the location information comprises coordinate information of a rectangle box surrounding the training object in the training image, and the confidence-score-translating function is as follows:

$$C_{i,j} = \begin{cases} 0, & \begin{aligned} & x_{left} > (i+1) \times (W_{unit}) \\ & y_{top} > (j+1) \times (H_{unit}) \\ & x_{right} < i \times (W_{unit}) \\ & y_{bottom} < j \times (H_{unit}) \end{aligned} \\ [\min((i+1) \times W_{unit}, x_{right}) - \max(i \times W_{unit}, x_{left})] \times & \\ [\min((j+1) \times H_{unit}, y_{bottom}) - & \\ \max(j \times H_{unit}, y_{top})] \div (W_{unit} \times H_{unit}), & \text{otherwise} \end{cases}$$

wherein, "$C_{i,j}$" is the correct confidence scores; "$x_{left}$" is a distance between a leftmost point of the rectangle box and a left boundary of the training image; "$y_{top}$" is a distance between an uppermost point of the rectangle box and an upper boundary of the training image; "$x_{right}$" is a distance between a rightmost point of the rectangle box and a right boundary of the training image; "$y_{bottom}$" is a distance between a lowermost point of the rectangle box and a lower boundary of the training image; "$W_{unit}$" is a ratio of a width of the training image to the cut precision; and "$H_{unit}$" is a ratio of a height of the training image to the cut precision.

18. The object-detecting device of claim 15, wherein the edge emphasis function is to take a square root of an inverse of each of the correct confidence scores.

* * * * *